United States Patent

Yano et al.

[15] 3,668,310

[45] June 6, 1972

[54] MAGNETIC VIDEO RECORDING AND REPRODUCING APPARATUS

[72] Inventors: Osahiko Yano, Kadoma; Mitsuaki Ono, Osaka, both of Japan

[73] Assignee: Matsushita Electric Industrial Co., Ltd., Osaka, Japan

[22] Filed: June 2, 1970

[21] Appl. No.: 42,709

[30] Foreign Application Priority Data

| | | |
|---|---|---|
| June 5, 1969 | Japan | 44/44779 |
| June 5, 1969 | Japan | 44/44778 |
| June 10, 1969 | Japan | 44/46661 |
| June 10, 1969 | Japan | 44/46662 |

[52] U.S. Cl. ..........178/6.6 A, 179/100.2 E, 179/100.2 MD, 179/100.2 T, 346/74 M

[51] Int. Cl. ..........G11b 5/86, G11b 21/00, H04n 5/78

[58] Field of Search ..........178/6.6 A; 179/100.2 E, 100.2 T, 179/100.2 MI; 346/74 M

[56] References Cited

UNITED STATES PATENTS

| | | | |
|---|---|---|---|
| 3,229,035 | 1/1966 | Bounsall | 178/6.6 A |
| 3,541,577 | 11/1970 | Lemke | 179/100.2 E |

*Primary Examiner*—Howard W. Britton
*Attorney*—Stevens, Davis, Miller & Mosher

[57] ABSTRACT

A magnetic video recording and reproducing apparatus by which television signals can be recorded and reproduced in the form of an ordinary recording pattern and simultaneously television signals, if necessary, can be recorded in the form of a recording pattern having a mirror-image relationship with the said ordinary recording pattern so that a master tape adapted for use with a contact transfer method is produced.

7 Claims, 9 Drawing Figures

MAGNETIC VIDEO RECORDING AND REPRODUCING APPARATUS

The present invention relates to a magnetic video recording and reproducing apparatus.

At present, nearly all the television broadcasting programs are first recorded on magnetic tape and then broadcast at a suitable time later from broadcasting stations. There is another case where a mother or master tape is first produced to produce daughter or slave tapes from this mother tape and only these daughter tapes are employed for broadcasting. A precision-class four-head rotary type video tape recorder has been utilized not only for broadcasting, but also for various other applications such as education and training purposes. The use of video tape recorders has simplified the broadcasting of the same program with a time lag from one region to another in a country having a vast territory such as America, to broadcast programs over distant areas such as overseas, or to preserve a permanent record of a program.

On the other hand, this has necessitated the production of numerous reproductions of the same program. Heretofor, the production of video tapes has been carried out in such a manner that a mother tape is reproduced by one video tape recorder and the reproduced signals are then re-recorded on daughter tapes by means of one or more video tape recorders. With this method, it was impossible to produce a large number of reproductions within a short space of time, since a program lasting an hour required the same time hour to reproduce it. Furthermore, as a large number of video tape recorders were utilized, the cost of equipment amounted to an enormous sum and much expense and labor were also required for their adjustment and maintenance. These circumstances gave rise to a demand for a high speed and inexpensive apparatus for producing video tapes and the establishment of this technique. To meet this demand, an apparatus has recently been developed which is capable of producing video tapes by a contact transcription method and now the mass production of video tapes is possible.

An object of the present invention is therefore to provide a useful means to produce a master tape which can be used with video tape duplicating apparatus employing the contact printing method. In contact printing, the magnetic surfaces of a recorded master tape and an unrecorded slave tape are brought into close proximity and a transferring magnetic field is externally applied to transfer the signals recorded on the master tape onto the slave tape. Consequently, the recorded pattern on the master tape must have a mirror-image relation with respect to the original program and a video tape recorder having such a mirror-image relation must be employed to produce a master tape. Therefore, according to the present invention a precision-class four-head rotary type video tape recording and reproducing apparatus now employed in television broadcasting stations and the like may be partially modified so that it can produce a master tape for the mass production of video tapes in addition to its normal recording and reproducing operations.

It is essential to a master tape employed for contact printing to have a higher coercive force as compared with ordinary video tapes. And in order to record signals on a tape having such a high coercive force and reproduce the recorded signals, it is important that a recording current an emphasis for playback and the like are selected to have preset values which suit the master tape. Accordingly, it is another object of the present invention to provide a method of automatically determining recording and reproducing conditions.

It is a further object of the present invention to provide a video tape recorder capable of producing a master tape that can be used in production by a contact printing method of video tapes used with broadcasting four-head type video tape recording apparatus. According to the present invention, a precision-class four-head rotary type video tape recorder can be adapted to readily produce a transferring master tape simply by changing the direction of rotation of a head drum from one direction to another depending on whether a master tape is recorded and reproduced or an ordinary video tape is recorded and reproduced and by changing the positions of an audio head assembly and a control head symmetrically with respect to the longitudinal central axis of a tape depending on which of the said two kinds of tapes is being used.

A still further object of the present invention is to provide a novel means by which an erasing head, an audio head assembly and a control head are rearranged into their symmetrical positions with respect to the plane of rotation of a head drum and the direction of rotation of a capstan is reversed to thereby produce a master tape.

A still further object of the present invention is to provide a novel means by which the magnitude of the coercive force of a tape is automatically detected so that the recording and reproducing conditions are automatically adjusting to best suit the tape being used.

Therefore, the present invention consists of a precision-class four-head rotary type magnetic video recording and reproducing apparatus of the tape which is presently employed in television broadcasting stations and which is capable of producing a master tape for the mass production of video tapes in addition to normal video recording and reproducing operations. A process has recently been proposed wherein a master tape produced by recording a program on a tape having a large coercive force in a mirror-image relationship with an ordinary tape recording pattern, is placed in close contact with an ordinary unrecorded tape to apply a magnetic field thereto so as to transfer the signal pattern on the master tape onto the unrecorded tape, thereby producing a large number of video tapes of the same kind. The apparatus of the present invention is so constructed that it is also capable of producing such a transferring master tape.

Other objects, features and advantages of the present invention will be apparent from the following descriptions of the preferred embodiments taken in conjunction with the accompanying drawings in which.

Figure 1:
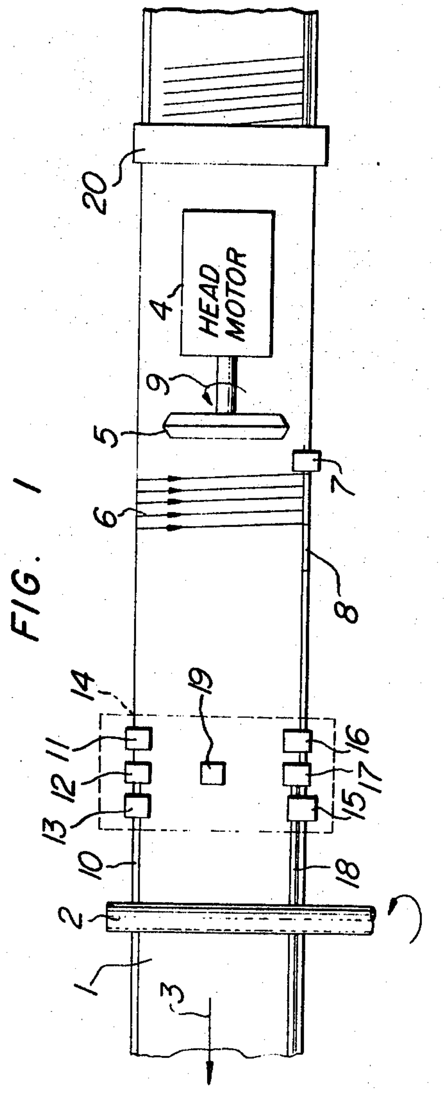
FIG. 1 is a schematic diagram of an embodiment of the present invention showing the manner in which an ordinary tape recording is done.
Figure 3A:
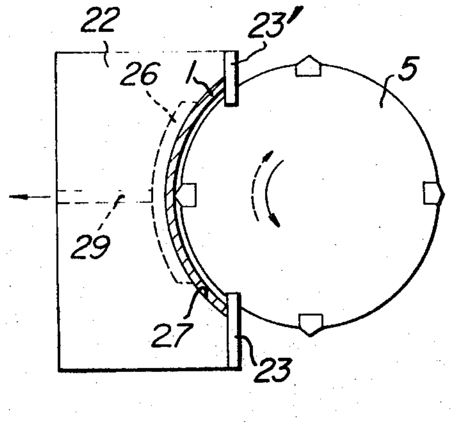
Figure 3B:
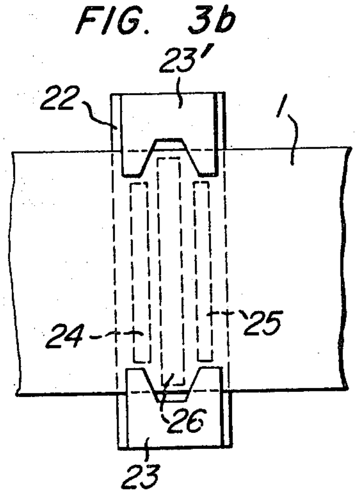
Figure 4:
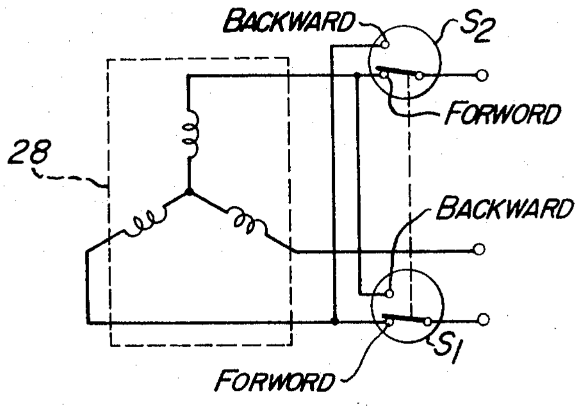
Figure 5:
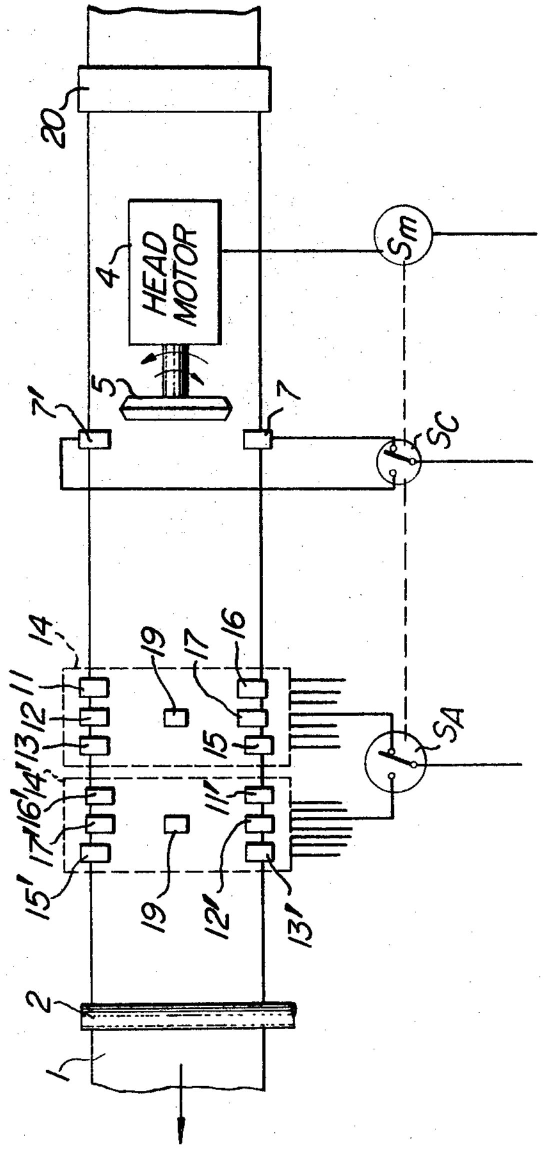
Figure 6:
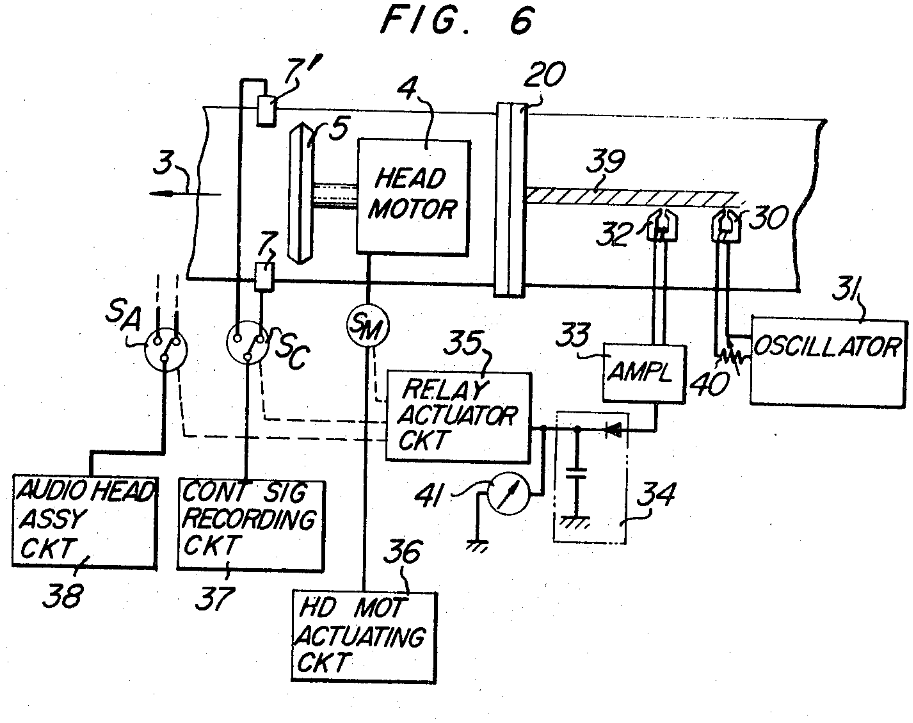
Figure 7:
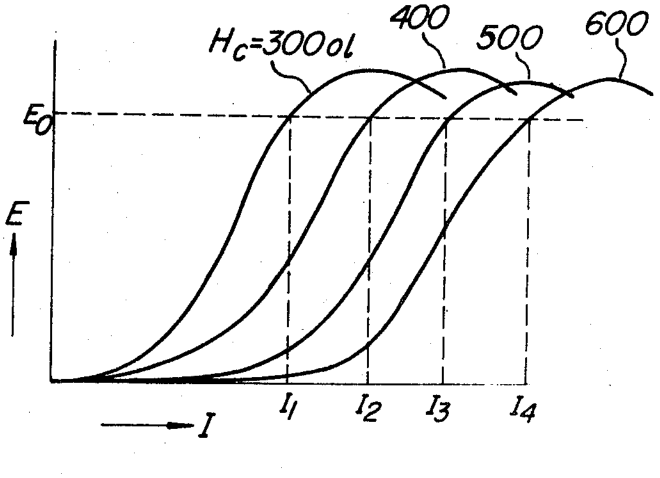
Figure 8:
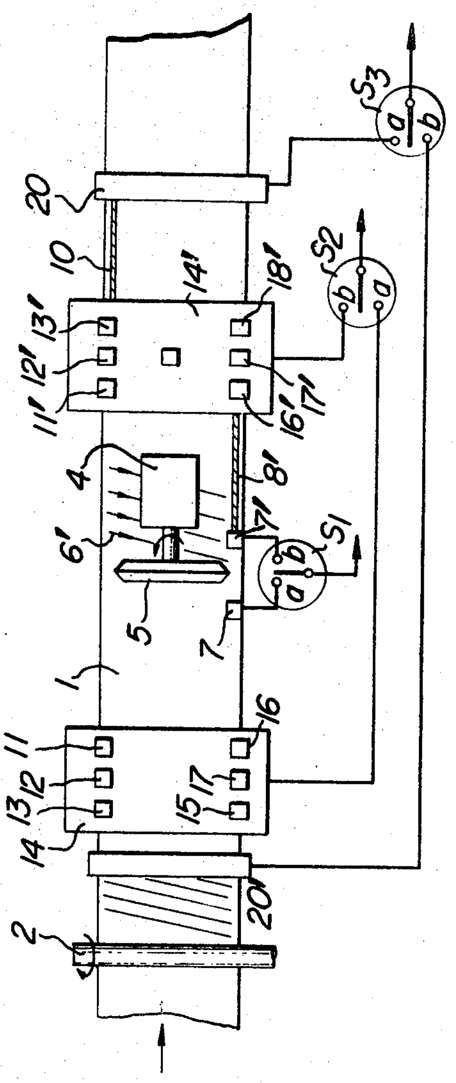

FIGS. 3*a* and 3*b* are side and front views showing the principal part of the apparatus of FIG. 1;

FIG. 4 is a wiring diagram showing by way of example a switching device for reversing the direction of rotation of a rotary head;

FIG. 5 is a schematic diagram showing another embodiment of the present invention;

FIG. 6 is a schematic diagram showing a further embodiment of the present invention;

FIG. 7 is a diagram for explaining the operation of the apparatus of FIG. 6; and FIG. 8 is a schematic diagram showing a still further embodiment of the present invention.

FIG. 1 schematically shows a four-head rotary magnetic video tape recorder in the condition for normal recording operation and the device is practically identical to the conventional video tape recorder of this kind. In the recording operation, a magnetic tape 1 is moved by a constant rotational speed capstan shaft 2 at a predetermined speed in the direction of an arrow 3, and a video signal is magnetically recorded in the direction perpendicular to the longitudinal direction of the tape 1 as a continuous, more specifically, a slightly slanted continuous line pattern 6 for a rotation through about 90° of four magnetic heads mounted 90° apart from one another on the periphery of a rotary head disk 5 connected to a head motor 4 which rotates at a speed of 240 revolutions per second in the direction of an arrow 9 perpendicular to the direction of movement of the magnetic tape. Accordingly, four recorded line patterns will be produced for a rotation of the disk 5. On the other hand, a signal is recorded by a fixed magnetic head 7 through pulse recording for a rotation of the rotary heads so that this signal is utilized as a control signal for the capstan servomotor during playback. Here, while the loci or line patterns as recorded by the rotary heads are imposed across the width of the tape 1 extending from one edge to another, the fixed head 7 is disposed in front of the rotary heads in the direction of tape transportation as shown in the figure and a saturation recording is employed so that the video signal loci or patterns are erased to form a control track as shown by numeral 8. Furthermore, an audio track 10 is located still ahead of the head 7, and an erasing head 11, a recording and reproducing head 12 and a simaltaneous reproducing head 13 are disposed on the opposite edge of the tape. These heads are put together with a simultaneous reproducing head 15 of the control signal, a Q track erasing head 16 for recording and reproducing the Q signal, a recording and reproducing head 17 and a video track monitoring head 19 to make a whole audio head assembly 14. Numeral 20 designates an erasing head for erasing the record along the whole width of the tape. It is further arranged so that the tape is bent on a circular arc by a guide means (not shown) to come into proper contact with the rotary heads.

Figure 2:
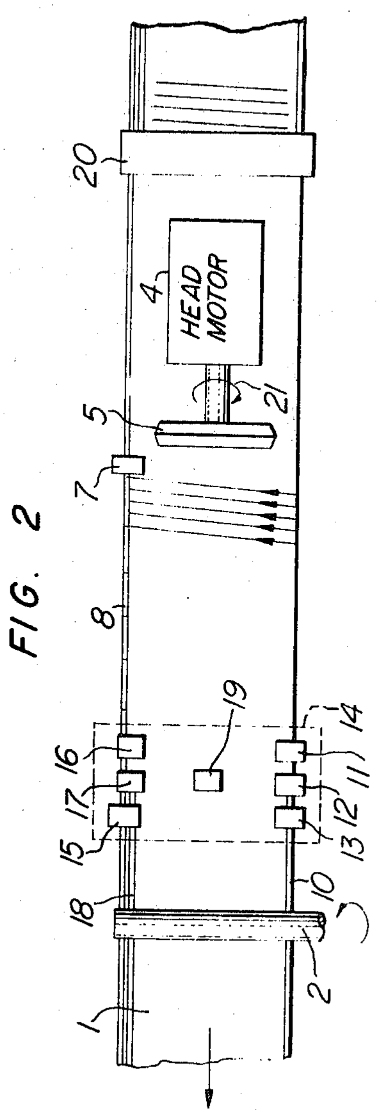
FIG. 2 is a schematic diagram showing the manner in which a master tape recording is done by the apparatus of FIG. 1.

With the arrangement described above, the operation of the apparatus when employed to produce a transferring master tape will now be explained. FIG. 2 schematically illustrates the conditions in the apparatus during this operation in which the direction of rotation of the rotary head disk 5 is reverse to that which takes place in the normal recording operation of FIG. 1 and the control head 7 and the audio head assembly 14 are placed in symmetrically reverse positions with respect to the longitudinal center line of the tape. This will require a structural modification so as to rearrange a positioning member mounted on a tape guide means (female guide) disposed opposite to the rotary head disk 5 so that the positioning member normally controlling one edge of the tape now also regulates the opposite edge of the tape. According to the arrangement of the present invention, as shown in FIGS. 3*a* and 3*b*, a female guide 22 is disposed in a position opposite to the rotary head disk 5 (rotating in the direction of the solid line arrow) in order that the magnetic tape 1 is properly guided and brought into contact with the disk 5, and the magnetic tape 1 is thus bent in a plane with a circular arc having the common central axis with the rotary head disk 5 so that the former is pressed against the latter. A slot 26 is a relief slot into which the head tips are urged through the intermediary of the tape, and grooves 24 and 25 cut on the opposite sides of the slot 26 are communicated with an exhaust port 29 to reduce the air pressure in these grooves to that below atmospheric pressure so they can serve to suitably contact the magnetic tape 1 with an arcuate guide surface 27. Numerals 23 and 23' designate stoppers mounted on the opposite edges of the arcuate guide surface 27 so that the edge portions of the tape 1 are pressed against the stoppers by the friction between the tape and the heads caused by the rotation of the heads to thereby prevent the vertical motion of the tape during its transport. Therefore, with the arrangement of FIG. 2 adapted for producing a mirror-image master tape, the direction of rotation of the rotary head disk 5 in FIG. 3 is as shown by a dotted line arrow so that the stopper 23' can practically serve its purpose effectively. On the other hand, in order to rotate a rotary head driving a three-phase synchronous motor 4 in either forward or reverse directions, circuit connections of the terminals of a motor exciting winding 28 may be interchanged by means of switches $S_1$ and $S_2$.

Referring now to FIG. 5, there is shown another embodiment of the present invention, in which an audio head assembly 14 comprising the head array of FIG. 1 and an audio head assembly 14' comprising the head array of FIG. 2 are disposed in juxtaposition in the direction of tape movement, and a control head 7' is placed symmetrically with a control head 7 with respect to the longitudinal central axis of the tape. Furthermore, interchange between the assemblies 14 and 14' and between the control heads 7 and 7' as well as a change in direction of rotation of a head driving motor 4 are effected by means of switches $S_A$, $S_C$ and $S_M$ which are all interlocked. In other words, the positions of the switches $S_A$, $S_C$ and $S_M$ are changed so that the same operations as explained with reference to FIG. 1 or FIG. 2 take place depending on whether it is a normal tape recording or a master tape recording. It should be understood that although the arrangement just described has shown an example wherein the two head assemblies are permanently provided, if necessary, these assemblies 14 and 14' may be interchangeably used depending on the normal tape recording or the master tape recording.

Next, an example of a method by which the positions of the switches $S_M$, $S_C$ and $S_A$ are automatically changed according to the kind of tape being used, that is, a master tape or a slave tape, will be explained. The arrangement shown in FIG. 6 is identical to that of FIG. 5 excepting that automatic switch actuating means are added. In FIG. 6, a tape is moved in the direction of an arrow 3. Two magnetic heads 30 and 32 are disposed to the front of an erasing head 20 so that signals having a suitable frequency are recorded on the tape by the magnetic head 30 to produce recorded tracks or patterns 39. Numeral 31 designates an oscillator which supplies current to the recording head 30. The other magnetic head 32 is disposed above the recorded tracks 39 to reproduce the signals on the recorded tracks. In this case, the magnitude of a necessary current supplied to the magnetic head 30 to produce the recorded tracks 39 differs depending on the coercive force of the magnetic tape being used. These conditions will be explained with reference to FIG. 7 in which the abscissa I represents the values of the recording current supplied to the magnetic head 30 and the ordinate E represents the values of the reproduced output from the magnetic head 32. For example, if a magnetic tape is used whose coercive force Hc is 300 oersted, the reproduced output from the magnetic head 32 has a value $E_o$ when the recording current $I_1$ is supplied to the magnetic head 30. However, if a magnetic tape is employed whose coercive force is 600 oersted, the reproduced output becomes almost zero with the application of the recording current $I_1$. Thus, with the supply of the recording current $I_1$ to the magnetic head 30, it is possible to distinguish between a master tape and a slave tape in accordance with the presence of the reproduced output from the magnetic head 32. An example of the arrangement by which the positions of the switches $S_M$, $S_C$ and $S_A$ are automatically changed according to the presence of the reproduced signal from the magnetic head 32 will now be explained. The reproduced signal from the magnetic head 32 is applied, after amplification by amplifier 33, to a relay actuator circuit 35 through a rectifier circuit 34, so that when the output from the magnetic head 32 falls short of a predetermined level $E_o$, which means that the tape being used is a master tape, the switches $S_M$, $S_C$ and $S_A$ are thrown so that a master is recorded on the tape. On the other hand, if the tape being used is a slave tape, the magnetic head 32 produces the reproduced output $E_o$, which is in turn amplified by the amplifier 33 and then supplied to the rectifier circuit 34 where it is converted into a DC voltage. This DC voltage operates the relay actuator circuit 35 so that the switches $S_M$, $S_C$ and $S_A$ are now thrown into the slave recording positions. Numeral 36 designates a circuit for actuating the head motor 4, 37 a control signal recording circuit, and 38 a circuit for the audio head assembly.

It is now apparent from the foregoing that there is a difference in the coercive force between an ordinary video tape and a master tape and that each of these tapes requires a particular recording current as well as a recording and reproducing emphasis which will suit it in order that a recording on the respective tapes and the reproduction thereof can be achieved.

Now, a method of adjusting the recording and reproducing conditions such as recording current and recording and reproducing emphasis in accordance with the coercive force of different tapes will be explained hereunder.

In FIG. 6, numeral 40 designates a volume control for adjusting the recording current supply to the magnetic head 30, and numeral 41 designates a meter which indicates the DC voltage corresponding to the reproduced output from the magnetic head 32 that has been amplified and rectified. As will be seen from FIG. 7, the magnitude of recording current differs according to the coercive force of different tapes, so that the recording current adjusting volume control 40 may be adjusted to gradually increase the recording current to a point where a reading on the indicating meter 41 reaches a predetermined value. In other words, the position of the adjusting volume control 40 is selected so that a recording current is attained which is best suited to an individual tape. In this case, if this adjusting volume control is interlocked with the control signal recording circuit 37, the audio head assembly circuit 38 and the video signal recording and reproducing circuit and the like, the recording and reproducing conditions of the respective signals may be automatically set to the optimum values simply by adjusting the adjusting volume control 40 according to the reading on the indicator meter 41. It is to be understood that the detecting means comprising the magnetic heads 30 and 32 etc., are not needed at all times during a recording operation and that it will be sufficient if they perform their functions during the starting period of the recording.

FIG. 8 shows another embodiment of the apparatus of the invention which is capable of producing a transferring master tape. In this figure, numerals 1 to 20 designate the same component parts as shown in FIG. 1 and they function in the same manner as in the case of FIG. 1 during normal recording. This arrangement differs from that of FIG. 1 in that another set of a control head 7', an audio head assembly 14', and an erasing head 20' are symmetrically disposed with respect to the plane of rotation of the rotary drum disk 5 so that these control heads 7 and 7', audio head assemblies 14 and 14' and the erasing heads 20 and 20' may be interchanged by means of the change-over switches $S_1$, $S_2$ and $S_3$, and at the same time the direction of rotation of a capstan 2 is made reversible. With this arrangement, for master tape recording purposes the capstan 2 is rotated in a direction opposite to that which takes place during normal tape recording and the operations of the control head 7', audio head assembly 14' and the erasing head 20' produce such recorded tracks or patterns 6', 8' and 10' which are mirror images of those which will be produced during normal tape recording.

What is claimed is:

1. A magnetic recording and reproducing apparatus, comprising:
first magnetic head means;
means transporting a magnetic tape at a predetermined speed past said first magnetic head means;
means rotating said first magnetic head means in a first direction relative to the direction of movement of said magnetic tape in a plane substantially perpendicular to the direction of movement of said tape, said first magnetic head means contacting said magnetic tape through a locus of points having a predetermined angle with respect to said substantially perpendicular plane;
first and second control signal magnetic head means and first and second audio signal head means disposed in operative engagement with respective edge portions of said magnetic tape;
and means for selectively recording one of two recording patterns on said magnetic tape, said patterns being mirror images of each other, said selective recording means including means reversing the relative directions of movement of said magnetic tape and said first magnetic head means and means selecting between said first and second control signal head means and between said first and second audio signal head means, depending upon the relative direction of movement of said tape and first magnetic head means.

2. Apparatus according to claim 1, further comprising:
recording head means for recording line patterns on said tape;
reproducing head means for reproducing the recorded line patterns from said tape;
means connected to said recording head means for recording a signal field onto said tape, said signal field having a field strength less than that required to record a signal on a master tape and greater than that required to record a signal on a slave tape having a lower coercivity than said master tape;
detecting means connected to the output of said reproducing head means for detecting the strength of the signal field reproduced by said reproducing head means; and
means connecting the output of said detecting means to said selective recording means and said reversing means, said selective recording means and reversing means being activated as a function of the strength of the signal field detected by said detecting means.

3. The apparatus according to claim 1, further comprising:
recording head means for recording line patterns on said tape;
reproducing head means for reproducing the recorded line patterns from said tape;
first adjusting means to adjust the field strength of said line patterns being recorded on said tape; and
second adjusting means connected to said first adjusting means for concurrently adjusting the field strength of signals applied to said tape by said first magnetic head means, said control signal magnetic head means and said audio signal magnetic head means.

4. A magnetic video recording and reproducing apparatus, comprising:
first magnetic head means;
means selectively transporting a magnetic tape at a predetermined speed past said first magnetic head means in one of first and second directions, respectively;
means rotating said first magnetic head means in a plane substantially perpendicular to the direction of movement of said tape, said first magnetic head means contacting said magnetic tape through a locus of points having a predetermined angle with respect to said substantially perpendicular plane;
first and second control signal magnetic head means symmetrically disposed with respect to the plane of rotation of said first magnetic head means and in operative engagement with respective edge portions of said magnetic tape;
first and second audio signal magnetic head means symmetrically disposed with respect to the plane of rotation of said first magnetic head means and in operative engagement with respective edge portions of said magnetic tape; and
means to selectively record one of two recording patterns on said magnetic tape, said patterns being mirror images of each other, including means for reversing the direction of movement of said magnetic tape and means selecting between said first and second control signal head means and between said first and second audio signal head means depending upon the selected direction of movement of said magnetic tape.

5. Apparatus according to claim 4, further comprising:
recording head means for recording line patterns on said tape;
reproducing head means for reproducing the recorded line patterns from said tape;
means connected to said recording head means for recording a signal field onto said tape, said signal field having a field strength less than that required to record a signal on a master tape and greater than that required to record a signal on a slave tape having a lower coercivity than said master tape;
detecting means connected to the output of said reproducing head means for detecting the strength of the signal field reproduced by said reproducing head means; and
means connecting the output of said detecting means to said selective recording means and said reversing means, said selective recording means and reversing means being activated as a function of the strength of the signal field detected by said detecting means.

6. A magnetic video and reproducing apparatus, comprising:

first magnetic head means;

means transporting a magnetic tape at a predetermined speed past said first magnetic head means;

means selectively rotating said first magnetic head means in one of first and second directions relative to the direction of movement of said magnetic tape in a plane substantially perpendicular to the direction of movement of said tape, said first magnetic head means contacting said magnetic tape through a locus of points having a predetermined angle with respect to said substantially perpendicular plane;

a first head group, including first control signal magnetic head means and audio signal head means;

a second head group, including second control signal magnetic head means and second audio signal head means;

said first and second head groups being symmetrically disposed with respect to the longitudinal axis of said tape and in operative engagement with respective edge portions of said tape;

and means to selectively record one of two recording patterns on said magnetic tape, said patterns being mirror images of each other, including means for reversing the direction of rotation of said first magnetic head means and means selecting between said first and second head groups depending upon the selected direction of rotation of said first magnetic head means.

7. Apparatus according to claim 6, further comprising:

recording head means for recording line patterns on said tape;

reproducing head means for reproducing the recorded line patterns from said tape;

means connected to said recording head means for recording a signal field onto said tape, said signal field having a field strength less than that required to record a signal on a master tape and greater than that required to record a signal on a slave tape having a lower coercivity than said master tape;

detecting means connected to the output of said reproducing head means for detecting the strength of the signal field reproduced by said reproducing head means; and means connecting the output of said detecting means to said selective recording means and said reversing means, said selective recording means and reversing means being activated as a function of the strength of the signal field detected by said detecting means.

* * * * *